US009681150B2

(12) United States Patent
Garud et al.

(10) Patent No.: US 9,681,150 B2
(45) Date of Patent: Jun. 13, 2017

(54) OPTICAL FLOW DETERMINATION USING PYRAMIDAL BLOCK MATCHING

(71) Applicant: TEXAS INSTRUMENTS INCORPORATED, Dallas, TX (US)

(72) Inventors: Hrushikesh Tukaram Garud, Maharashtra (IN); Soyeb Noormohammed Nagori, Bangalore (IN); Dipan Kumar Mandal, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 182 days.

(21) Appl. No.: 14/737,904

(22) Filed: Jun. 12, 2015

(65) Prior Publication Data

US 2015/0365696 A1 Dec. 17, 2015

(30) Foreign Application Priority Data

Jun. 13, 2014 (IN) .......................... 2898/CHE/2014

(51) Int. Cl.
*H04N 19/53* (2014.01)
*H04N 19/56* (2014.01)

(52) U.S. Cl.
CPC ............. *H04N 19/53* (2014.11); *H04N 19/56* (2014.11)

(58) Field of Classification Search
CPC ...................................................... H04N 19/53
See application file for complete search history.

(56) References Cited

U.S. PATENT DOCUMENTS

| 8,472,669 B2* | 6/2013 | Sharma ................. G06T 7/2033 348/169 |
| 2012/0176536 A1* | 7/2012 | Levy ..................... H04N 7/0127 348/441 |
| 2014/0254882 A1* | 9/2014 | Jin .......................... G06T 7/003 382/107 |

* cited by examiner

*Primary Examiner* — Tung Vo
*Assistant Examiner* — Rowina Cattungal
(74) *Attorney, Agent, or Firm* — Gregory J. Albin; Charles A. Brill; Frank D. Cimino (57) ABSTRACT

An image processing system includes a processor and optical flow determination logic. The optical flow determination logic is to quantify relative motion of a feature present in a first frame of video and a second frame of video with respect to the two frames of video. The optical flow determination logic configures the processor to convert each of the frames of video into a hierarchical image pyramid. The image pyramid comprises a plurality of image levels. Image resolution is reduced at each higher one of the image levels. For each image level and for each pixel in the first frame, the processor is configured to establish an initial estimate of a location of the pixel in the second frame and to apply a plurality of sequential searches, starting from the initial estimate, that establish refined estimates of the location of the pixel in the second frame.

22 Claims, 5 Drawing Sheets

OPTICAL FLOW DETERMINATION USING PYRAMIDAL BLOCK MATCHING

CROSS-REFERENCE TO RELATED APPLICATIONS

The present application claims priority to India Provisional Patent Application No. 2898/CHE/2014, filed Jun. 13, 2014, titled "Pyramidal Block Matching Dense Optical Flow Algorithm For Real Time Embedded Applications," which is hereby incorporated herein by reference in its entirety.

BACKGROUND

The observed motion of objects in an image, or sequence of images, due to relative motion between an optical sensor, such as a camera, and the objects present in the image is termed optical flow or optic flow. The term optical flow is generally applied in the computer vision domain to incorporate related techniques from image processing and control of navigation, such as: motion detection, object segmentation, time-to-contact information, focus of expansion calculations, luminance, motion compensated encoding, and stereo disparity measurement. Such techniques are of special interest in automotive driver assist systems, robotics, and other applications that apply machine vision.

SUMMARY

A system and method for optical flow determination using pyramidal block matching is disclosed herein. In one embodiment, an image processing system includes a processor and optical flow determination logic. The optical flow determination logic is to quantify relative motion of a pixel or feature present in a first frame of video and a second frame of video with respect to the two frames of video. The optical flow determination logic configures the processor to convert each of the frames of video into a hierarchical image pyramid. The image pyramid comprises a plurality of image levels. Image resolution is reduced at each higher one of the image levels. For each image level and for each pixel or feature in the first frame, the processor is configured to establish an initial estimate of a location of the pixel in the second frame and to apply a plurality of sequential searches, starting from the initial estimate, that establish refined estimates of the location of the pixel or feature in the second frame. A first of the sequential searches identifies a pixel at a first distance from the initial estimate that most closely matches the pixel in the first frame as a first refined estimate of the location of the pixel in the second frame. A second of the sequential searches identifies a pixel at a second distance from the first refined estimate that most closely matches the pixel in the first frame. The first distance is not less than the second distance.

In another embodiment, a method for optical flow measurement includes acquiring a first frame of video and a second frame of video. Each of the first frame of video and the second frame of video is converted into a hierarchical image pyramid. The image pyramid includes a plurality of image levels. Image resolution is reduced at each higher one of the image levels. For each image level and each pixel of the first frame: an initial estimate of a location of the pixel in the second frame is established, a plurality of sequential searches are applied starting from the initial estimate that establish refined estimates of the location of the pixel in the second frame, and value of optical flow for the pixel in the first frame is determined based on the refined estimates. In a first of the sequential searches, a pixel at a first distance from the initial estimate that most closely matches the pixel in the first frame is identified as a first refined estimate of the location of the pixel in the second frame. In a second of the sequential searches, a pixel at a second distance from the first refined estimate that most closely matches the pixel in the first frame is identified as a second refined estimate of the location of the pixel in the second frame. The first distance is not less than the second distance.

In a further embodiment, a non-transitory computer-readable medium is encoded with instructions that when executed by a processor cause the processor to retrieve a first frame of video and a second frame of video; to convert each of the frames of video into a hierarchical image pyramid, wherein the image pyramid comprises a plurality of image levels, with image resolution reduced at each higher one of the image levels. For each image level and each pixel in the first frame, to compute optical flow for the pixel, the instructions cause the processor to establish an initial estimate of a location of the pixel in the second frame, and apply a plurality of sequential searches, starting from the initial estimate, that establish refined estimates of the location of the pixel in the second frame. A first of the sequential searches identifies a pixel at a first distance from the initial estimate that most closely matches the pixel in the first frame as a first refined estimate of the location of the pixel in the second frame. A second of the sequential searches identifies a pixel at a second distance from the first refined estimate that most closely matches the pixel in the first frame. The first distance is not less than the second distance.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. Terms such as: flow vector, motion vector, motion estimate, and image velocity are interchangeably used to mean optical flow measurement in horizontal and vertical dimensions. The recitation "based on" is intended to mean "based at least in part on." Therefore, if X is based on Y, X may be based on Y and any number of other factors.

Conventional optical flow estimation algorithms may be relatively computationally intensive. As a result, resolution, frame rates, etc. may be limited when implementing conventional optical flow estimation algorithms in a real-time context. Additionally, some conventional optical flow estimation algorithms may require multipass implementations, and are therefore unsuitable for implementation in hardware.

Embodiments of the present disclosure include a novel process for optical flow determination using pyramidal block matching. Embodiments disclosed herein enable estimation of motion as instantaneous image velocities (pixel motion) based on a pair of images (e.g., temporally ordered images), and optionally on historic evidence of the image velocities and parametric models of the image velocities. Embodiments apply hierarchical motion estimation with a coarse-to-fine search methodology that minimizes a cost function over the images. Suitable cost functions may be sum of absolute differences (SAD) over pixel values or hamming distance over binary feature descriptors. Embodiments anticipate that over a small spatial and temporal neighborhood image velocities are constant/slowly varying and use spatial and temporal predictors to provide accurate motion estimation in small or large motion conditions. Embodiments may apply relative simple computational operations that allow for implementation using hardware of reasonable complexity while outperforming conventional optical flow estimation algorithms that are significantly more computationally intensive.

Figure 1:
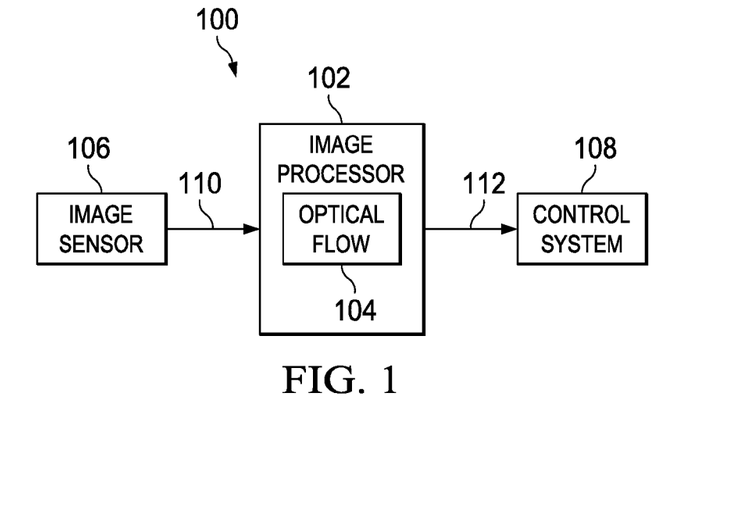
FIG. 1 shows a block diagram for a system that determines and applies optical flow in accordance with various embodiments.

FIG. 1 shows a block diagram for a system 100 that determines and applies optical flow in accordance with various embodiments. The system 100 includes an image sensor 106, an image processor 102, and a control system 108. The image sensor 106 may include a charge coupled device (CCD), a complementary metal oxide semiconductor (CMOS) image sensor, or other device that detects light and converts the detected light into electrical signals. The image sensor 106 may include a plurality of photodetectors arranged in a two-dimensional array. The image sensor 106 may periodically capture an image representative of the field of view of the image sensor 106. For example, the image sensor 106 may capture 15, 30, 60, or any suitable number of images per second. The image sensor 106 may be incorporated in a digital video camera. Some embodiments may include multiple image sensors 106.

The images captured by the image sensor 106 may be provided to the image processor 102 as one or more an arrays of binary values, where each binary value may represent an intensity or color of light detected at a particular photodetector of the image sensor 106 (i.e., a picture element (pixel)). Each image provided to the image processor 102 by the image sensor 106 may be referred to as a frame. The image processor 102 analyzes or manipulates the images 110 received from the image sensor 106 to extract information from the images 110. The image processor 102 includes optical flow logic 104 that analyzes the images 110 received from the image sensor 106 to measure optical flow of the various elements or features present in the images 110. The optical flow logic 104 applies hierarchical motion estimation with a coarse-to-fine searching, as disclosed herein, that provides improved optical flow measurement while reducing computational complexity relative to conventional optical flow estimation methods.

The optical flow measurements 112 generated by the image processor 102 may be provided to the control system 108. The control system 108 may apply the optical flow measurements 112 to control the motion of the system 100, to present motion information to a user of the system 100, etc. For example, if the system 100 is an automotive driver assist system (ADAS), then the control system 108 may apply the optical flow measurements 112 to determine whether a vehicle should change speed and/or direction based on the relative motion of vehicle and objects detected by the image processor 102. In some ADAS implementations, the control system 108 may autonomously change vehicle speed and direction based, at least in part, on the optical flow measurements 112, while in other embodiments the control system 108 may, based on the optical flow measurements 112, provide alerts to an operator of the vehicle indicating that changes in speed and/or direction may be advisable. Similarly, in robotics, and other motion control applications, the control system 108, may control movement (speed and/or direction) of an element of the system 100 based on the optical flow measurements 112.

Figure 2:
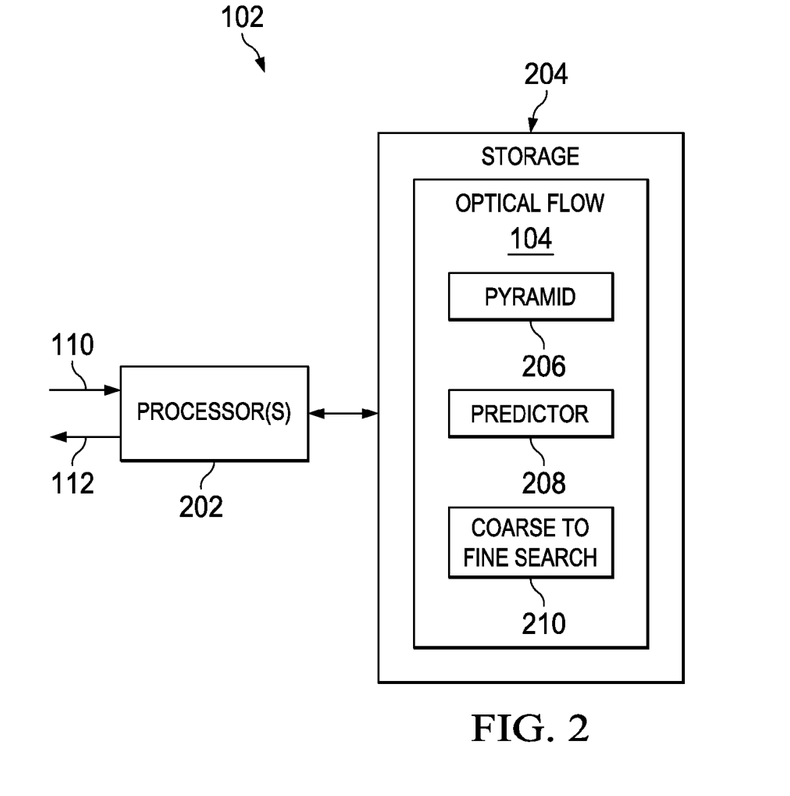
FIG. 2 shows a block diagram for an image processor configured to determine optical flow in accordance with various embodiments.

FIG. 2 shows a block diagram for the image processor 102 in accordance with various embodiments. The image processor 102 includes one or more processors 202 and storage 204. The processors 202 may include a general-purpose microprocessor, a digital signal processor, a microcontroller, a coprocessor, or other device capable of executing instructions retrieved from a computer-readable storage medium and suitable for use in an image processor. The processors 202 may include various architectures suitable for image processing. For example, the processors 202 may include a complex instruction set architecture (CISC), a reduced instruction set architecture (RISC), a superscalar architecture, a very long instruction word architecture (VLIW), etc. In one embodiment, the processors 202 may include a RISC processor coupled to a VLIW coprocessor or other coprocessor, where the coprocessor is configured to provide efficient manipulation of image data. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 204 may include non-volatile and/or volatile memory for storing instructions that are executed by the processors 202 and data that is processed by the processors 202. Examples of memory that may be suitable for implementing the storage 204 include semiconductor memory (RAM), such as static RAM (SRAM), FLASH memory, electrically erasable programmable read-only memory (EEPROM), ferroelectric RAM (FRAM), and other storage technologies suitable for use in the image processor 102.

The storage 204 includes optical flow logic 104. The optical flow logic 104 includes instructions that are executed by the processors 202 to determine optical flow between features of two images 110 as explained herein. The optical flow logic 104 includes pyramid logic 206, predictor logic 208, coarse to fine search logic 210, and instructions for implementing various other operations of optical flow measurement as disclosed herein. As further explained herein, the pyramid logic 206 is executed by the processors 202 to generate image pyramids and temporal predictor pyramids for use in optical flow measurement. The predictor logic 208 is executed by the processors 202 to generate and manipulate optical flow prediction values used to estimate an initial value of optical flow for a pixel. The coarse to fine search logic 210 is executed by the processors 202 to refine the initial estimate of optical flow via a number of increasingly fine adjustments. The operations of the processors 202, via execution of the optical flow logic 204, are explained herein by reference to FIGS. 3-9 and associated text.

Processors 202 execute instructions retrieved from the storage 204. Instructions alone are incapable of performing a function. Therefore, in the present disclosure, any reference to a function performed by logic or instructions, or to logic or instructions performing a function is simply a shorthand means for stating that the function is performed by the processors 202 executing the instructions.

Figure 3:
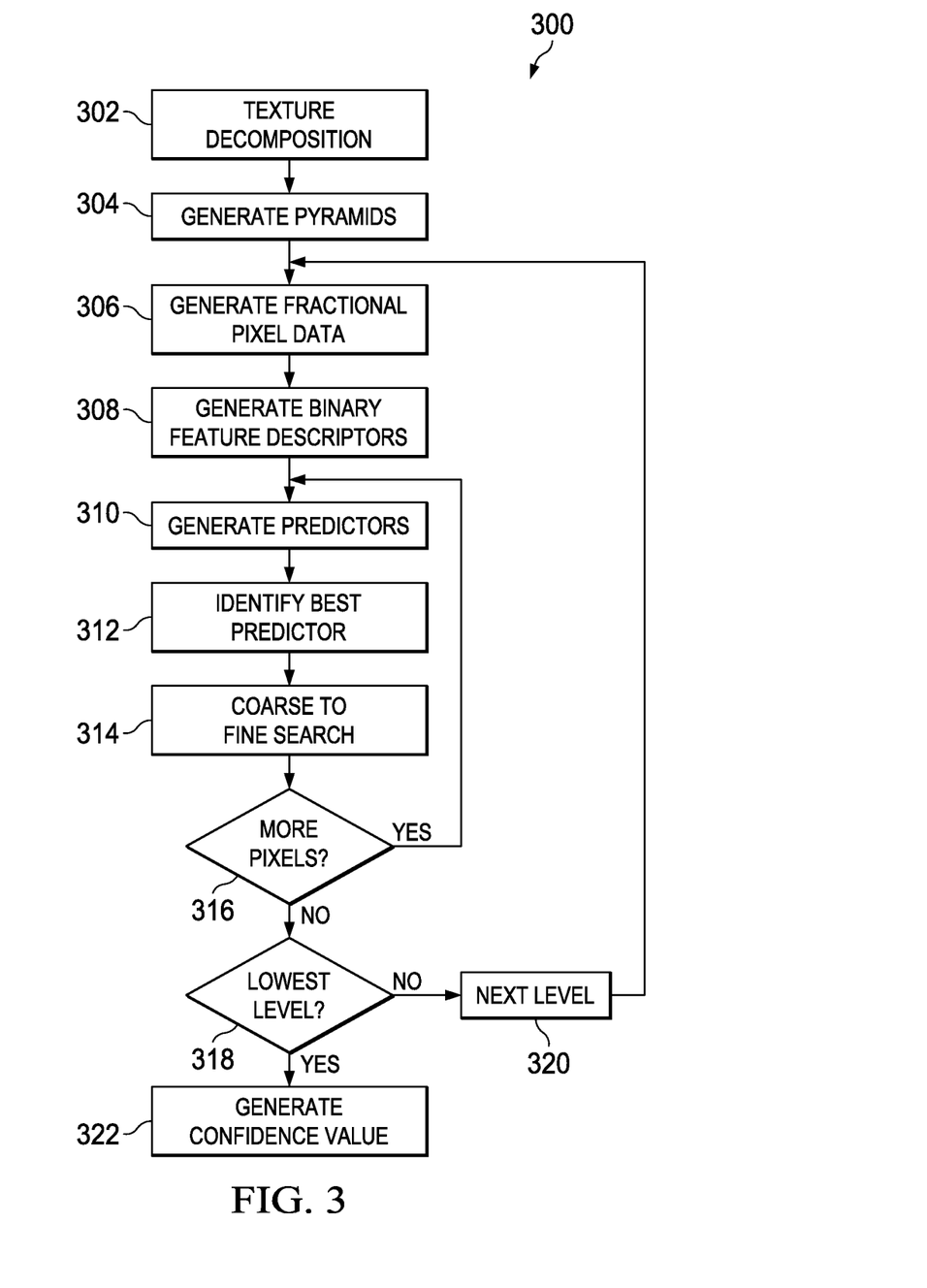
FIG. 3 shows a flow diagram for a method for determining optical flow in accordance with various embodiments.

FIG. 3 shows a flow diagram for a method 300 for determining optical flow in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 3, as well as other operations described herein, can be implemented as instructions stored in a computer readable medium (e.g., storage 204) and executed by the processors 202.

In block 302, the processors 202 have received images (i.e., frames of video) from the image sensor 106. The optical flow logic 104 processes two images to measure optical flow. A first image may be referred to as a query image and a second image by referred to as a reference image. The processors 202 execute the optical flow logic 104 to perform texture decomposition for the two images.

Some optical flow techniques exploit the brightness constancy constraint. The brightness constancy constraint is derived from the observation that surfaces usually persist over time and hence the intensity value of a small region remains the same despite its position change. Unfortunately, the assumption of brightness constancy is violated in most naturalistic sequences. To address this issue, embodiments may apply texture decomposition to extend the brightness constancy to high-order constancy such as gradients, second-order derivatives, and response to various linear filters. Image texture is generally immune to illumination changes. Some embodiments of the optical flow logic 104 may use image gradients for texture decomposition where gradient magnitude images obtained from the query and reference images may be used as pixel intensity for optical flow estimation. The gradient magnitude at a pixel location (x,y) of image I can be expressed as:

$$G(x,y)=|\partial I(x,y)/\partial x|+|\partial I(x,y)/\partial y|$$

where $\partial I(x,y)/\partial x$ and $\partial I(x,y)/\partial y$ are the partial derivatives in the horizontal and vertical dimensions computed using an appropriate 3×3 Sobel operator.

Figure 4:
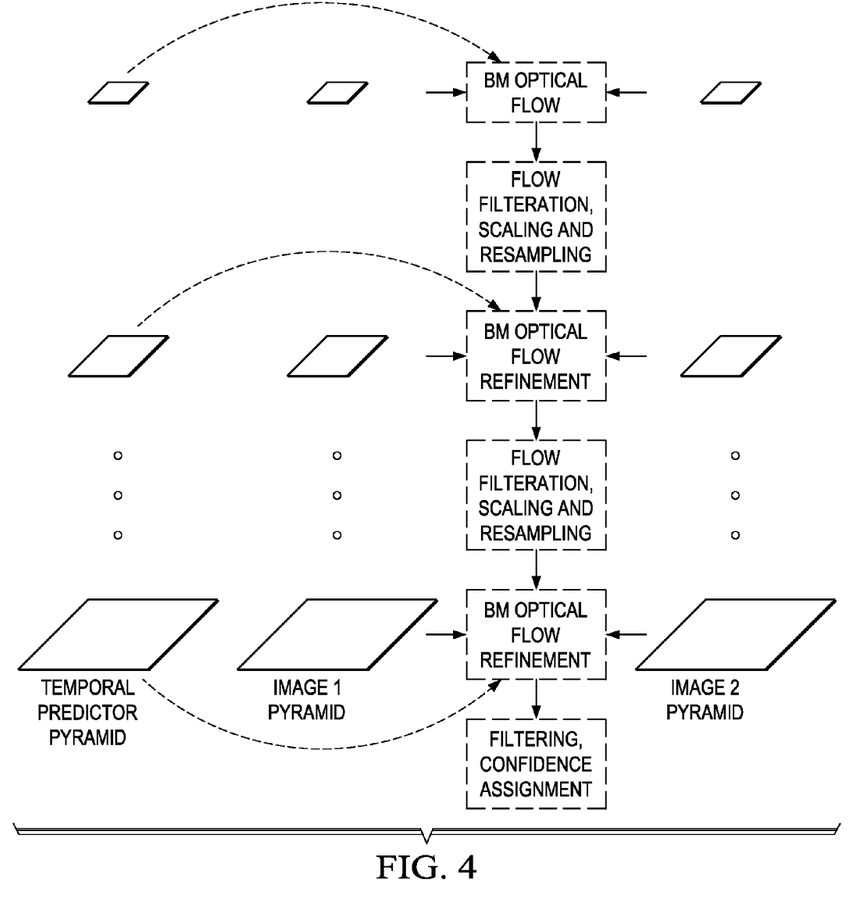
FIG. 4 shows image and temporal predictor pyramids applied in determining optical flow in accordance with various embodiments.

In block 304, the processors 202 generate image pyramids for each of the two images to be processed, and generate a temporal predictor pyramid for optical flow predictions derived from optical flow measurements of a previously processed frame of video. FIG. 4 shows a representation of the two image pyramids and the temporal predictor pyramid generated by the processors 202. The operations applied to generate the pyramids and measure optical flow using the pyramids are described below.

The processors 202 generate Gaussian pyramids for creation of hierarchical image data. For each image, given the number of levels (N) to be included in the pyramid and the downscaling factor between two adjacent levels of the pyramid, the processors 202, via execution of the pyramid logic 206, generate an image pyramid having N levels where the resolution of each higher level is downscaled by the scaling factor from the resolution of the adjacent lower level. For example, an image pyramid may include six image layers (N=6) where each layer is half the resolution (scaling factor=0.5) in each dimension relative to the next lower layer. The downscaling may include applying a Gaussian filter to the data of the adjacent lower level of the pyramid and decimating the filtered data in two dimensions to reduce the number of samples to that required by the higher level.

The following pseudocode further exemplifies generation of the image pyramid.

---

Image_Pyramid_Generation( )

Input: Grayscale image (I), Required number of pyramid levels N, Down scaling factor between two consecutive pyramid levels
- For example N = 6 and scaling factor = 0.5 indicate that every $n^{th}$ image in the pyramid is half the resolution in both dimensions of the image at level (n−1).

Output: Image pyramid of N levels
Preprocessing:
- If input image has dimensions W×H and the image pyramid is to have N levels the image is padded in both directions such that resultant image dimensions W'×H' are multiple of $2^{(N-1)}$. For example 1920×1080 input image will be padded with 8 rows in the bottom when creating pyramid of six(6) levels to get 1920×1088 image.
- The padded pixels have value 0.
- Let the padded image be called I'.

Process:
Let $P_i$ represent the image in the $i^{th}$ pyramid level
Initialization: $P_1$ = I'
FOR (i = 2; i<=N; i++) % i represents the level in image pyramid
    Filter $P_{(i-1)}$ with Gaussian filter of size m×m (m=5) and sigma= 1.61
    Obtain scaled down image $P_i$ by dropping alternate lines in both dimensions
END

---

The processors 202, via execution of the pyramid logic 206, also generate a Gaussian pyramids of temporal/ego motion predictor data. Optical flow measurements (temporal flow predictors) from a previously processed frame (e.g., one of the reference or query images) are processed into a pyramid for use in predicting the optical flow of the image currently being processed. The number of levels and scaling factor may be the same as those used in image pyramid generation, and the processing is similar to that applied in image pyramid generation with addition of the flow values scaling functionality.

The following pseudocode further exemplifies generation of the temporal predictor pyramid.

---
Temporal_Predictor_Pyramid_Generation( )
---

Input: Flow predictors (F), Required number of pyramid levels N, Down scaling factor between two consecutive pyramid levels
- For example N = 6 and scaling factor = 0.5 indicate that every $n^{th}$ image in the pyramid is of half the resolution of the image at $(n-1)^{th}$ level. These values may be same as used in image pyramid generation.
- The predictor data at each pixel location has two values, flow in horizontal and vertical dimensions respectively.

Output: Flow pyramid of N levels
Preprocessing:
If input predictor data has dimensions W×H and the pyramid is to have N levels the image is padded in both directions such that resultant data has size W'×H' multiple of $2^{(N-1)}$.
- The padded pixels have value 0.
- Let the padded image be called F'.

Process:
Let $P^F_i$ represent the flow data in the $i^{th}$ pyramid level
Initialization: $P_1 = F'$
FOR (i = 2; i<=N; i++) % i represents the level in image pyramid
    Filter $P^F_{(i-1)}$ with Gaussian filter of size m×m (m=5) and sigma= 1.61
    Obtain scaled down image $P^F_i$ by dropping alternate lines in both dimensions and scaling the flow values by the scaling factor used for pyramid generation
END In block 306, starting with the lowest resolution layer, layer by layer processing of the image pyramids begins with generation of fractional pixel data. To provide computationally efficient motion estimation with resolution smaller than the integer image velocities, the processors 202, via execution of the optical flow logic 104, generate fractional pixel data (image pixel values at the non-integer locations) for the image being processed (e.g., the reference image). The fraction pixel data may be used during binary feature computation and consequently during the search process explained below. The processor 202 may apply a bilinear interpolation method to predict pixel values in non-integer locations. For a given pyramid level, the fractional pixel data is generated for all possible displacements over range (0,1) in the steps of finest search resolution. Thus, for the finest search resolution of 0.25 pixels, 21 fractional pixel values are generated.

In block 308, the processors 202, via execution of the optical flow logic 104, generate binary feature descriptors for the image pixels. The image processor 102 measures optical flow using a coarse-to-fine search that minimizes a cost function. Suitable cost functions include SAD over pixel values or hamming distance over the binary feature descriptors.

Figure 5:
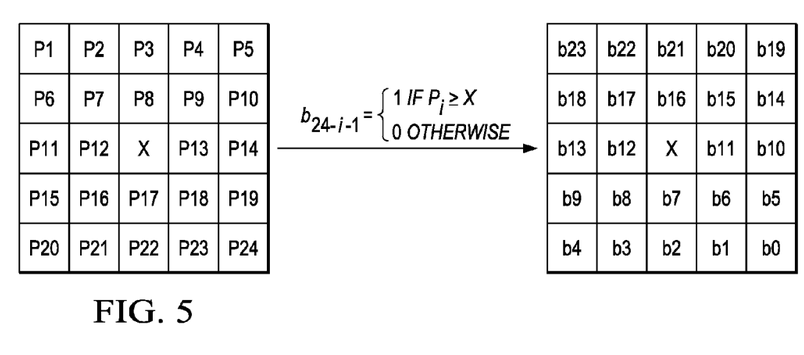
FIG. 5 shows application of a census transform to generate a binary feature descriptor of a pixel for use in determining optical flow in accordance with various embodiments.

When using Hamming distance over binary feature descriptors as the cost function, the optical flow logic 104 may employ a binary census transform as the binary feature descriptor. Census transform is a form of non-parametric local transform (i.e., the transform relies on the relative ordering of local intensity values, and not on the intensity values themselves) used to map the intensity values of the pixels within a pixel's neighborhood window to a bit string, thereby capturing the image structure around that pixel. FIG. 5 shows an example of generating a 24 bit census descriptor for a central pixel x considering its 24 neighbors and their relationship with the central pixel x. A bit corresponding to a neighborhood pixel is set to 1 if the neighborhood pixel has a grayscale value greater than or equal to the grayscale value of the pixel x, otherwise the bit is set to 0. Some embodiments may use a 24-bit census transform descriptor to represent the pixels. Other embodiments may use a different length of the census descriptor and/or a contiguous or non-contiguous set of neighborhood pixels.

In block 310, pixel by pixel processing of each of the image pyramid layers begins with predictor generation. The processors 202, via execution of the predictor logic 208, generate a list of predictors for use in establishing an initial estimate of optical flow for a pixel. Predictors may be the known (i.e., preexisting) optical flow estimates for spatial and/or temporal neighbors of the pixel. The predictors can be used as the initial estimates for the block matching search based optical flow estimation process for the pixel. Some embodiments of the optical flow logic 104 use six different predictors which include: (1) optical flow estimates for the four eight-connected neighbor pixels that precede the current pixel when traversing the image in raster scan order from left to right and top to bottom, (2) an existing flow estimate for the current pixel, and (3) zero motion vector (0,0). Some embodiments of the optical flow logic 104 may also use the co-located estimates from the flow pyramid constructed for temporal predictors, making the total number of predictors in such embodiments—seven.

Figure 6:
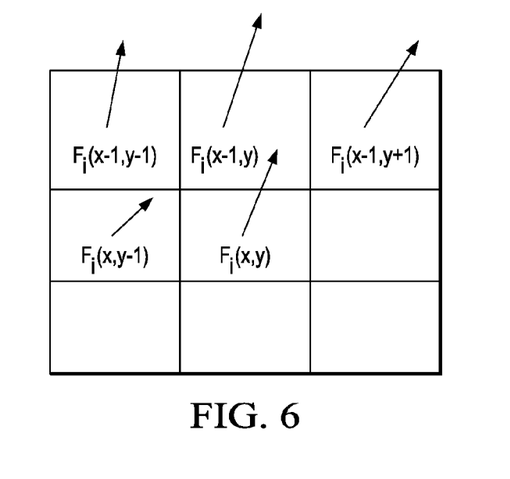
FIG. 6 shows candidate spatial descriptors for use in determining optical flow in accordance with various embodiments.

FIG. 6 illustrates the first five candidate predictors listed above ((1) and (2) above), and shows the predictors' source positions in the 3×3 neighborhood of the current pixel. Predictors may be expressed in fractional-pixel resolution, and when used as an initial flow estimate are rounded off to the nearest integer location. If any predictor has an absolute flow value that exceeds a threshold value, called search range, in horizontal direction (e.g., 128 pixels) or vertical direction (e.g., 64 pixels) the predictor is removed from the list of candidate predictors. The processors 202 also compute a median predictor to be used in the search process by independently finding the median of the horizontal and vertical components of the candidate predictors.

Figure 7:
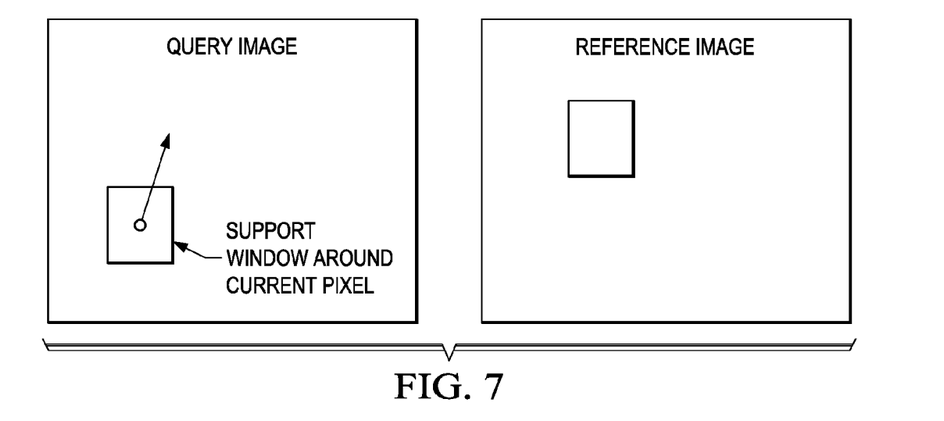
FIG. 7 shows a support window applied to a pixel to determine optical flow in accordance with various embodiments.
Figure 8:
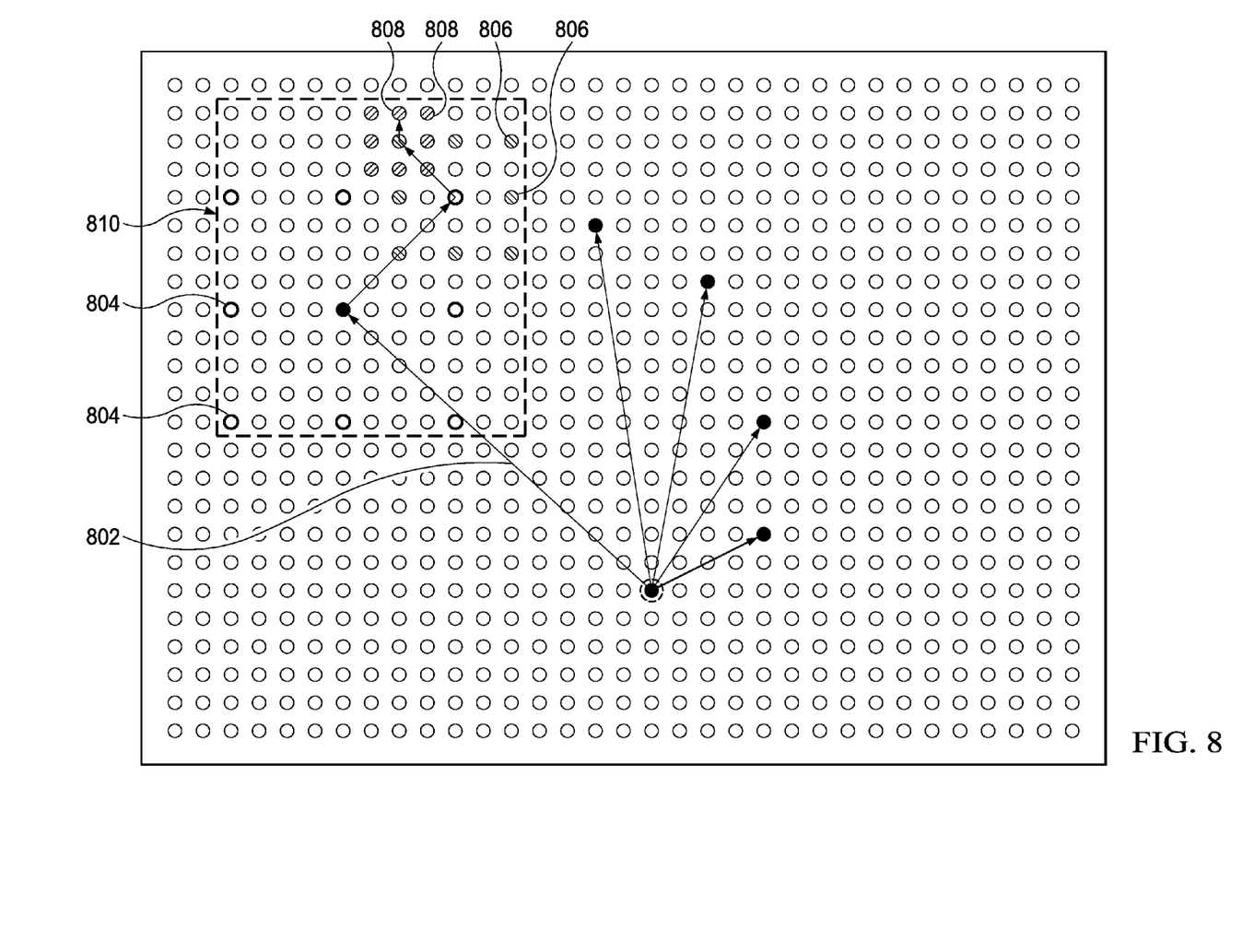
FIG. 8 shows a coarse to fine search applied to determine optical flow in accordance with various embodiments.

In block 312, the processors 202, via execution of the predictor logic 208, identify the best of the candidate predictors to apply as the initial estimate of optical flow. Considering a square neighborhood of m×m pixels (e.g., m=9) around the current pixel (referred to as the search support window) in the query image, the processors 202 identify the best candidate predictor, where the best candidate predictor is the candidate predictor that that minimizes the cost function value (e.g., SAD or hamming distance) in the reference image. Minimizing the cost function value identifies the best match of pixels between the two images. FIG. 7 illustrates the support windows from which data is used to evaluate the cost function for the individual predictors. FIG. 8 illustrates five candidate predictors and the identified best candidate predictor 802.

In block 314, the processors 202, via execution of the coarse to fine search logic 210, search about the identified best candidate predictor to refine the optical flow measurement. Area 810 identifies a pixel region in which a coarse to fine search is performed. The search includes multiple stages in which each successive stage searches within a smaller perimeter. For example, in some embodiments, the search may include:

- a first stage that considers the best predictor and the eight pixels 804 at an offset of four pixels about the best predictor;
- a second stage that considers the result of the first stage and the eight pixels 806 at an offset of two pixels about the result of the first stage;
- a third stage that considers the result of the second stage and the eight pixels 808 at an offset of one pixel about the result of the second;
- a fourth stage that considers the result of the third stage and the eight sub-pixels 902 (see FIG. 9) at an offset of one-half pixel about the result of the third stage; and
- a fifth stage that considers the result of the fourth stage and the eight sub-pixels 904 (see FIG. 9) at an offset of one-quarter pixel about the result of the fourth stage.

Figure 9:
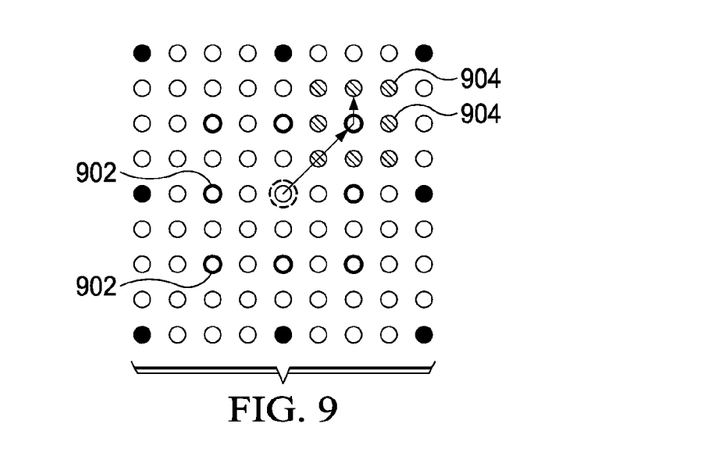
FIG. 9 shows a sub-pixel search of a coarse to fine search applied to determine optical flow in accordance with various embodiments.

The result of the fifth stage may be deemed the final value of optical flow for the pixel searched. Some embodiments may include more or fewer stages and/or different pixel offsets for the various search stages. The search may be restricted to the points that are within the search range centered at the pixel for which optical flow is being measured. In some embodiments, searching in layers of the image pyramid other than the lowest layer may terminate at a lower resolution than the search at the lowest layer of the image pyramid. For example the search at the lowest layer of the image pyramid may terminate at the fifth stage described above, while searches at higher layers of the image pyramid may terminate at the fourth or lower stage described above.

The cost function applied in the search stages of block 314 may be a combination of (e.g., a sum of) SAD or hamming distance and a motion vector cost value (MVCost). MVCost is defined as a product of a motion smoothness factor ($\lambda$) and vector distance between the search point and the median predictor.

In block 316, the processors 202 determine whether all pixels of the current image layer have been processed. If additional pixels of the current image layer are to be processed, then processing of the current image layer continues in block 310. If all pixels of the current layer of the image pyramid have been processed, then, the optical flow measurements for the current layer of the image pyramid may be filtered using a 2D median filter of size m×m (m=5), and, in block 318, the processors 202 determine whether the lowest image layer of the image pyramid has been processed.

If the lowest layer of the image pyramid has not been processed, then, in block 320, the next lower level of the image pyramid is selected for processing, and flow estimates for the next lower level of the image pyramid are generated by up-scaling the flow estimate resolution using nearest neighbor interpolation and scaling the flow vectors by the resolution upscale factor (e.g., reciprocal of the down scaling factor). Processing of the next lower layer of the image pyramid continues in block 306.

If the lowest layer of the image pyramid has been processed, then, optical flow measurement is complete, and the measurements generated at the lowest level of the image pyramid are the final optical flow measurement values. In block 322, the processors 202, via execution of the optical flow logic 204, generate a confidence level value for each optical flow measurement value. In some embodiments, the value of the cost function for an optical flow measurement may be converted to a confidence value using a sigmoid function defined as:

$$C(x, y) = 1 - \frac{1}{1 + \left(\frac{Cost(x,y)}{F2}\right)^{-F1}}$$

where:

C(x,y) is a confidence value between 0 and 1;

Cost (x,y) is the value of the cost function for the final optical flow value.

The operation of optical flow measurement method described above may be further explained by reference to the pseudocode listing below.

---

Optical_Flow_Measurement( )

---

Input: Two grayscale images and Historic image velocity estimates or temporal predictors (all of dimensions W×H pixels)
Output: Dense optical flow estimate (F)
Pre-computation:
- Perform texture decomposition for query and reference data (optional)
- In one example the edge magnitude computation can be the texture decomposition method of choice
- Generate Gaussian pyramid of N levels for all the inputs Initialization: Flow estimates ($F_N$) to 0 for level N
FOR (i = N; i>0; i--) % i represents the level in image pyramid
  % Perform block matching optical flow on level i
  Input: Two images (query and reference) for which optical flow is to be estimated,
    existing flow estimates ($F_i$), temporal predictors ($F^T_i$) and/or ego motion predictors ($F^E_i$)

-continued

```
Optical_Flow_Measurement( )
```

Output: Updated flow estimates ($F_i$) / flow estimate for next pyramid level ($F_{i-1}$)
Process:
- Prepare the fractional pixel data for the reference image to predict image
  data in presence of fractional pixel displacements of object/ego motion.
  - Fractional pixel data is generated for all possible displacements over range
    (0,1) in the steps of finest search resolution.
  - Bilinear interpolation is used to obtain this data.
- If using Hamming distance(HD) over binary feature descriptor as the
  optimization function prepare binary pixel descriptors for query image,
  reference image and fractional pixel data
  - In one example the binary census transform can be the binary feature
    descriptor of choice
  FOR (All pixels in the query image) % Processed in raster scan order
          % Search process for motion estimation
      o Predictor list preparation
          o Prepare the list of valid predictors from available spatial, temporal,
            and parametric optical flow estimates % Predictors are the existing
            optical flow estimates for spatial, temporal neighbors
              ▪ In one example 5 spatial predictors + Zero motion predictor
                (0,0) can be used
      o Round off the predictors to nearest integer location
      o Remove from list the predictors that have absolute flow values
        larger than a threshold value %These independent threshold values
        for flow in horizontal and vertical directions are called search
        range and flow vector components are checked independently
        against them
      o Compute median of the horizontal and vertical direction predictors.
        Let the resultant flow vector be called the median predictor
      o Considering a square neighborhood of m×m (m=9) around the current
        pixel (called search support window) in query image find the best
        predictor (winner predictor) that minimizes the optimization function
        value (SAD/HD) in reference image
      o Coarse-to-fine Search: Considering a square neighborhood of m×m
        around the current pixel in query image, perform coarse-to-fine block
        search around the winner predictor minimizing the optimization
        function value.
          o The optimization function for this search involves the motion
            smoothness term that ensures the smoothness of flow estimate in
            small neighborhood
          o The search is restricted to the points that are within the search
            range centered around the query image pixel for which optical flow
            is being estimated
      END
- Perform 2D median filtering with kernel size m×m (m=5)of the updated flow
  estimates $F_i$
IF (i ≠ 1)
    % Obtain flow estimates for next pyramid level
    Input: Flow estimates for current level ($F_i$)
    Output: Flow estimate for next pyramid level ($F_{i-1}$)
    Process: -Upscale the flow estimate resolution using nearest neighbor
interpolation
          -Scale the flow values by the resolution upscale factor
ELSE
    F= $F_i$
    Convert the optimization function values/texture values to the confidence
    levels
    END
END The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An image processing system, comprising:
   a processor; and
   optical flow determination logic to quantify relative motion of a feature present in a first frame of video and a second frame of video with respect to the two frames of video, the optical flow determination logic configures the processor to:
   convert each of the frames of video into a hierarchical image pyramid, wherein the image pyramid comprises a plurality of image levels, with image resolution reduced at each higher one of the image levels; and
   for each image level:
      for each pixel in the first frame:
         establish an initial estimate of a location of the pixel in the second frame; and
         apply a plurality of sequential searches, starting from the initial estimate, that establish refined estimates of the location of the pixel in the second frame;
         wherein a first of the sequential searches identifies a pixel at the initial estimate or at a first distance from the initial estimate that most closely matches the pixel in the first frame as a first refined estimate of the location of the pixel in the second frame, and a second of the sequential searches identifies a pixel at the first refined estimate or at a second distance from the first refined estimate that most closely matches the pixel in the first frame;
wherein the first distance is not less than the second distance.

2. The image processing system of claim 1, wherein at least one of the sequential searches provides a refined estimate of the location of the pixel in the second frame with sub-pixel resolution.

3. The image processing system of claim 1, wherein the optical flow determination logic configures the processor to:
compute a plurality of predictor values for establishing the initial estimate;
compute a median predictor value from the plurality of predictor values; and
select the initial estimate based on the predictor value that identifies a pixel in the second frame that most closely matches the pixel in the first frame;
wherein the predictor values comprise:
optical flow measurements for a plurality of pixels adjacent to the location of the pixel in the second frame; and
an optical flow measurement for the location of the pixel in the second frame at a higher one of the image levels.

4. The image processing system of claim 3, wherein the optical flow determination logic configures the processor to:
convert measurements of optical flow for the first frame into a hierarchical temporal predictor pyramid, wherein the predictor pyramid comprises a plurality of levels, with resolution of a temporal predictor reduced at each higher one of the predictor levels; and
include in the predictor values a temporal predictor from the predictor pyramid.

5. The image processing system of claim 3, wherein the optical flow determination logic configures the processor to:
establish the initial estimate based on a cost function that determines which of the predictor values corresponds to a pixel in the second frame that most closely matches the pixel in the first frame;
for each of the sequential searches, apply the cost function to identify the refined estimate of the location of the pixel in the second frame;
wherein the cost function computes one of a sum of absolute differences and a hamming distance between pixels of a support window at the pixel in the first frame and pixels of a support window at a candidate pixel in the second frame.

6. The image processing system of claim 5, wherein the optical flow determination logic configures the processor to include in the cost function, for each of the sequential searches, a motion vector cost value that combines a motion smoothness factor and distance between the median predictor value and the candidate pixel.

7. The image processing system of claim 5, wherein the optical flow determination logic configures the processor to:
compute a binary census transform for each of the pixel in the first frame and the candidate pixel in the second frame, wherein the binary census transform establishes an intensity relationship between a given pixel and each of a plurality of pixels surrounding the given pixel; and
compute the hamming distance based on the binary census transforms.

8. The image processing system of claim 5, wherein the optical flow determination logic configures the processor to compute a confidence level value for the quantified relative motion based on a value of the cost function at completion of the sequential searches at a lowest of the image levels.

9. A method for optical flow measurement, comprising:
acquiring a first frame of video and a second frame of video;
converting each of the first frame of video and the second frame of video into a hierarchical image pyramid, wherein the image pyramid comprises a plurality of image levels, with image resolution reduced at each higher one of the image levels;
for each image level:
for each pixel in the first frame:
establishing an initial estimate of a location of the pixel in the second frame;
applying a plurality of sequential searches, starting from the initial estimate, that establish refined estimates of the location of the pixel in the second frame;
in a first of the sequential searches, identifying a pixel at the initial estimate or at a first distance from the initial estimate that most closely matches the pixel in the first frame as a first refined estimate of the location of the pixel in the second frame;
in a second of the sequential searches, identifying a pixel at the first refined estimate or at a second distance from the first refined estimate that most closely matches the pixel in the first frame as a second refined estimate of the location of the pixel in the second frame, wherein the first distance is not less than the second distance; and
determining a value of optical flow for the pixel in the first frame based on the second refined estimate.

10. The method of claim 9, further comprising providing in a last of the sequential searches a refined estimate of the location of the pixel in the second frame with sub-pixel resolution.

11. The method of claim 9, further comprising:
computing a plurality of predictor values for establishing the initial estimate; and
selecting the initial estimate based on the predictor value that identifies a pixel in the second frame that most closely matches the pixel in the first frame;
wherein the predictor values comprise:
optical flow measurements for a plurality of pixels adjacent to the location of the pixel in the second frame; and
an optical flow measurement for the location of the pixel in the second frame at a higher one of the image levels.

12. The method of claim 11, further comprising:
converting measurements of optical flow for the first frame into a hierarchical temporal predictor pyramid, wherein the predictor pyramid comprises a plurality of levels, with resolution of a temporal predictor reduced at each higher one of the predictor levels;
including in the predictor values a temporal predictor from the predictor pyramid.

13. The method of claim 9, further comprising:
establishing the initial estimate based on a cost function that determines which of the predictor values corresponds to a pixel in the second frame that most closely matches the pixel in the first frame;
for each of the sequential searches, applying the cost function to identify the refined estimate of the location of the pixel in the second frame;
computing the cost function as one of a sum of absolute differences and a hamming distance between pixels of a support window at the pixel in the first frame and pixels of a support window at a candidate pixel in the second frame.

14. The method of claim 13, further comprising:
computing a binary census transform for each of the pixel in the first frame and the candidate pixel in the second frame, wherein the binary census transform establishes an intensity relationship between a given pixel and each of a plurality of pixels surrounding the given pixel; and
computing the hamming distance based on the binary census transforms.

15. The method of claim 13, further comprising computing a confidence level value for the value of optical flow based on a value of the cost function corresponding to the value of optical flow.

16. A non-transitory computer-readable medium encoded with instructions that when executed by a processor cause the processor to:
retrieve a first frame of video and a second frame of video;
convert each of the frames of video into a hierarchical image pyramid, wherein the image pyramid comprises a plurality of image levels, with image resolution reduced at each higher one of the image levels;
for each image level:
for each pixel in the first frame:
to compute optical flow for the pixel:
establish an initial estimate of a location of the pixel in the second frame;
apply a plurality of sequential searches, starting from the initial estimate, that establish refined estimates of the location of the pixel in the second frame;
wherein a first of the sequential searches identifies a pixel at the initial estimate or at a first distance from the initial estimate that most closely matches the pixel in the first frame as a first refined estimate of the location of the pixel in the second frame, and a second of the sequential searches identifies a pixel at the first refined estimate or at a second distance from the first refined estimate that most closely matches the pixel in the first frame;
wherein the first distance is not less than the second distance.

17. The computer-readable medium of claim 16 encoded with instructions that when executed by a processor cause the processor to generate a refined estimate of the location of the pixel in the second frame with sub-pixel resolution in at least one of the sequential searches.

18. The computer-readable medium of claim 16 encoded with instructions that when executed by a processor cause the processor to:
compute a plurality of predictor values for establishing the initial estimate; and
select the initial estimate based on the predictor value that identifies a pixel in the second frame that most closely matches the pixel in the first frame;
wherein the predictor values comprise:
optical flow measurements for a plurality of pixels adjacent to the location of the pixel in the second frame; and
an optical flow measurement for the location of the pixel in the second frame at a higher one of the image levels.

19. The computer-readable medium of claim 18 encoded with instructions that when executed by a processor cause the processor to:
convert measurements of optical flow for the first frame into a hierarchical temporal predictor pyramid, wherein the predictor pyramid comprises a plurality of levels, with resolution of a temporal predictor reduced at each higher one of the predictor levels; and
include in the predictor values a temporal predictor from the predictor pyramid.

20. The computer-readable medium of claim 16 encoded with instructions that when executed by a processor cause the processor to:
establish the initial estimate based on a cost function that determines which of the predictor values corresponds to a pixel in the second frame that most closely matches the pixel in the first frame;
for each of the sequential searches, apply the cost function to identify the refined estimate of the location of the pixel in the second frame;
wherein the cost function computes one of a sum of absolute differences and a hamming distance between pixels of a support window at the pixel in the first frame and pixels of a support window at a candidate pixel in the second frame.

21. The computer-readable medium of claim 20 encoded with instructions that when executed by a processor cause the processor to:
compute a binary census transform for each of the pixel in the first frame and the candidate pixel in the second frame, wherein the binary census transform establishes an intensity relationship between a given pixel and each of a plurality of pixels surrounding the given pixel; and
compute the hamming distance based on the binary census transforms.

22. The computer-readable medium of claim 20 encoded with instructions that when executed by a processor cause the processor to compute a confidence level value for the optical flow based on a value of the cost function at completion of the sequential searches at a lowest of the image levels.

* * * * *